(12) United States Patent
Sokalski (10) Patent No.: US 10,119,463 B2
(45) Date of Patent: Nov. 6, 2018

(54) INFINITELY VARIABLE COMPRESSION RATIO AND SINGLE STROKE LENGTH MECHANISM OR DUAL STROKE LENGTH MECHANISM OF RECIPROCATING 2-CYCLE OR 4-CYCLE INTERNAL COMBUSTION ENGINE

(71) Applicant: Mark Albert Sokalski, Pittsburgh, PA (US)

(72) Inventor: Mark Albert Sokalski, Pittsburgh, PA (US)

( * ) Notice: Subject to any disclaimer, the term of this patent is extended or adjusted under 35 U.S.C. 154(b) by 0 days.

(21) Appl. No.: 15/819,084

(22) Filed: Nov. 21, 2017

(65) Prior Publication Data

US 2018/0163623 A1    Jun. 14, 2018

Related U.S. Application Data

(60) Provisional application No. 62/432,011, filed on Dec. 9, 2016.

(51) Int. Cl.
*F02B 75/04* (2006.01)
*F16H 1/46* (2006.01)
*F16H 35/00* (2006.01)
*F02B 75/02* (2006.01)

(52) U.S. Cl.
CPC ............ *F02B 75/048* (2013.01); *F02B 75/04* (2013.01); *F16H 1/46* (2013.01); *F16H 35/00* (2013.01); *F16H 35/008* (2013.01); *F02B 75/02* (2013.01); *F02B 2075/025* (2013.01); *F02B 2075/027* (2013.01)

(58) Field of Classification Search
CPC .. F02B 75/048; F02B 75/04; F02B 2075/025; F02B 2075/027; F02B 75/02; F16H 35/00; F16H 1/46; F16H 35/008
See application file for complete search history.

(56) References Cited

U.S. PATENT DOCUMENTS 5,040,502 A * 8/1991 Lassiter .................... F01B 9/02
                                                                123/197.4
5,465,648 A * 11/1995 Cy .......................... F02B 41/00
                                                                123/197.4
5,927,236 A * 7/1999 Gonzalez .............. F02B 75/048
                                                                123/197.4

(Continued)

*Primary Examiner* — Hung Q Nguyen (57) ABSTRACT

A balanced and rotating mechanism of an internal combustion engine, which combines adjustable variable compression ratio with long power and exhaust strokes and short intake and compression strokes to obtain an internal combustion engine with variable air intake flow and maintain a constant pressure ignition. The mechanism includes a mirror-image planetary-gear assembly, a gear-pin assembly, and a piston-and-connecting rod assembly. The mirror-image planetary-gear assembly includes a first planetary-gear assembly and a second planetary-gear assembly; wherein each includes a sun gear, a primary planet gear, a plurality of secondary planet gears, and a ring gear. The first planetary-gear assembly and the second planetary-gear assembly are mounted along a main rotation axis, offset from each other and mirroring each other. The gear-pin assembly is eccentrically connected between the primary planet gears. Resultantly, rotating the sun gears alters the orientation of the gear-pin assembly, and thus changing the top dead center height.

15 Claims, 5 Drawing Sheets

(56) References Cited

U.S. PATENT DOCUMENTS

| | | | |
|---|---|---|---|
| 6,349,684 B1* | 2/2002 | de Gooijer | F01B 9/02 |
| | | | 123/197.4 |
| 9,279,363 B2* | 3/2016 | De Gooijer | F02B 67/04 |
| 9,726,078 B2* | 8/2017 | Shen | F02B 75/048 |
| 2012/0125297 A1* | 5/2012 | Lee | F02B 75/044 |
| | | | 123/48 B |
| 2014/0360292 A1* | 12/2014 | De Gooijer | F16H 37/124 |
| | | | 74/44 |
| 2018/0163623 A1* | 6/2018 | Sokalski | F02B 75/04 |

* cited by examiner

INFINITELY VARIABLE COMPRESSION RATIO AND SINGLE STROKE LENGTH MECHANISM OR DUAL STROKE LENGTH MECHANISM OF RECIPROCATING 2-CYCLE OR 4-CYCLE INTERNAL COMBUSTION ENGINE

The current application claims a priority to the U.S. Provisional Patent application Ser. No. 62/432,011 filed on Dec. 9, 2016.

FIELD OF THE INVENTION

The present invention relates generally to alternative designs for an internal combustion engine. More specifically, the present invention is an internal combustion mechanism capable of varying the top dead center position of a piston, thus varying the overall compression ratio of the internal combustion engine. The compression ratio may be varied anytime and almost instantaneously, thus allowing for each stroke within a cycle to be customized for increased performance and higher efficiency. The present invention may be implemented in a two-cycle or four-cycle internal combustion engine. Additionally, the present invention also provides long power and exhaust strokes and short intake and compression strokes for implementation into four-cycle internal combustion engine.

BACKGROUND OF THE INVENTION

The present invention applies to all types of internal combustion reciprocating piston engines as the present invention allows for varying the piston travel upward stop position. Additionally, the present invention allows for two different piston stroke travel lengths to be implement within a one complete four-cycle operation.

Otto, Diesel, Joule-Brayton, Wankel, Atkinson, Moteki, and others, have created different apparatus and methods for internal combustion engines. The present invention (known as the SOWDA engine) combine the positive benefits of the above-mentioned inventions into one unique all-encompassing design. The benefits of four-stoke (Otto), constant pressure compression ignition (Diesel), infinitely variable compression ratio (Moteki), a long power stroke and a short compression stroke (Atkinson), and a balanced centrifugal rotating mechanism (Wankel) makes the present invention extremely unique and highly energy efficient. The present invention provides an internal combustion engine with the Atkinson's long and short piston stroke length motions, the variable compression ratio concept similar to Moteki, the intake air flow throttling control of the Otto cycle, and the constant ignition pressure of the Diesel cycle.

The present invention provides fixed long power and exhaust strokes with fixed short intake and compression strokes. In practicality, the power and exhaust strokes may be set 40% to 50% longer than the intake and compression strokes.

Energy/fuel consumption for lawn-tractors, golf carts, chain saws, automobiles, trucks, buses, airplanes, power generators, etc. has become more and more critical to the economic stability and environmental stability of the earth. Presently, no apparatus or method provides the intake airflow throttling control of the Otto four-stroke cycle and the constant pressure ignition of the Diesel four-stroke cycle, while at the same time, applying the Atkinson long and short stroke cycles and packaged into a small balanced centrifugal rotating mechanism easily adapted to existing internal combustion technology at a reasonable expense. Internal engines equipped with the present invention can operate on almost any fuel and perform at extremely high efficiencies with or without a turbo charger or super-charger. As a result, the present invention can be applied to all reciprocating internal combustion engines using virtually any gas, liquid, or solid fuel, or any combination or blend, thereof.

DETAIL DESCRIPTIONS OF THE INVENTION

All illustrations of the drawings are for the purpose of describing selected versions of the present invention and are not intended to limit the scope of the present invention.

The present invention generally relates to alternative designs for an internal combustion engine. More specifically, the present invention is a balanced and rotating compact mechanism adapted to a conventional reciprocating internal combustion engine. The present invention combines infinitely adjustable variable compression ratio with long power and exhaust strokes and short intake and compression strokes (Atkinson), so as to obtain an internal combustion engine with variable intake air flow (Otto) and still maintain a constant pressure ignition (Diesel).

The present invention is an internal combustion (IC) mechanism integrated into an internal combustion engine. For simplicity purposes, the present invention is disclosed as being integrated into an internal combustion engine with a single cylinder. At the core, referring to FIG. 1 and FIG. 2, the present invention comprises a piston-and-connecting rod assembly 27, a gear-pin assembly 20, and a mirror-image planetary-gear assembly 1. Similar to conventional designs, the piston-and-connecting rod assembly 27 is the linearly reciprocating component which transfers force from an expanding gas to the mirror-image planetary-gear assembly 1. The mirror-image planetary-gear assembly 1 in conjunction with the gear-pin assembly 20 act as a crank mechanism to convert the reciprocating motion of the piston-and-connecting rod assembly 27 into rotation motion to be used at the output of the internal combustion engine. Additionally, the mirror-image planetary-gear assembly 1 and the gear-pin assembly 20 vary and control the compression ratio of the internal combustion engine.

Figure 1:
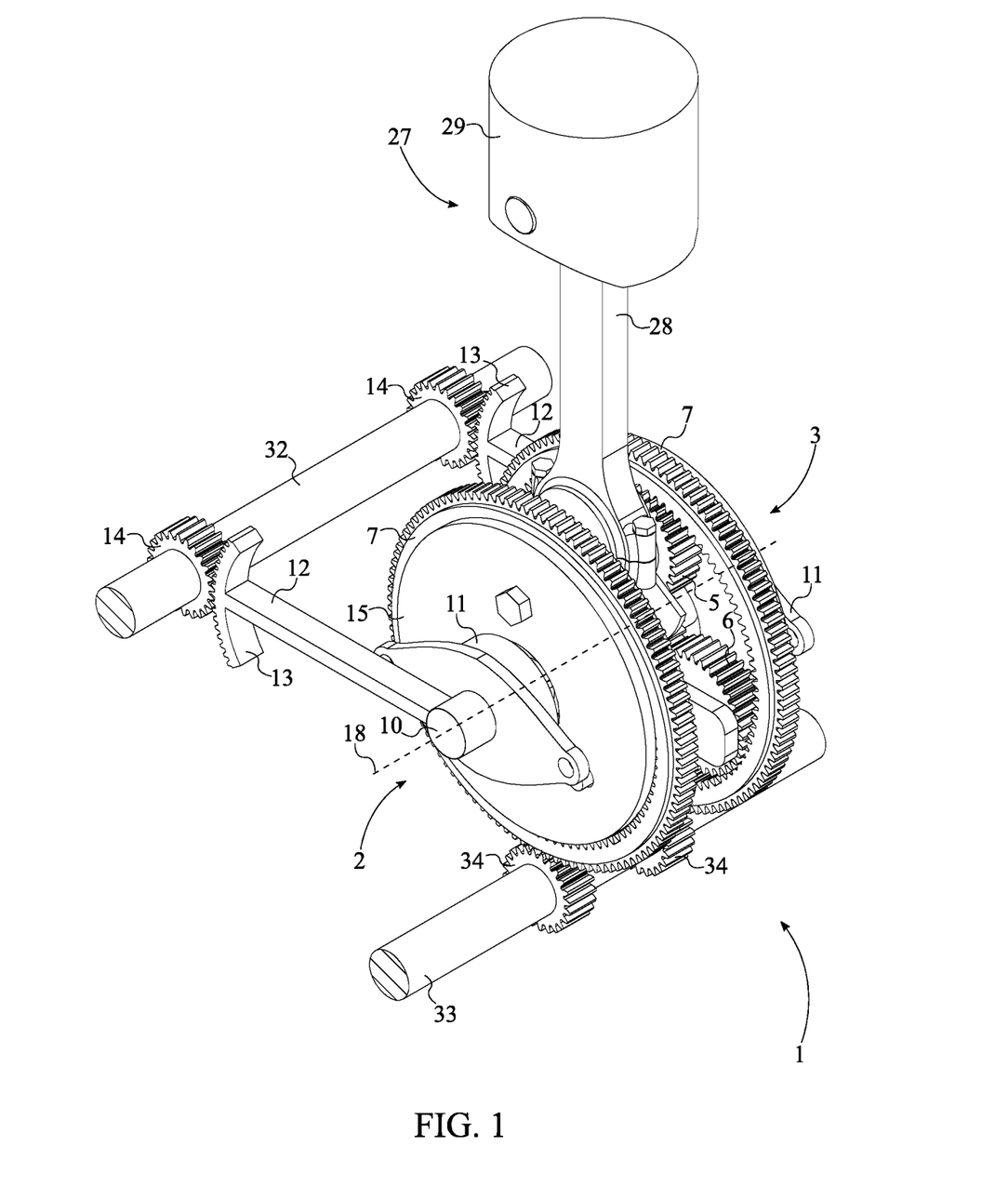
FIG. 1 is a perspective view of the present invention.

The mirror-image planetary-gear assembly 1 makes up the body of the present invention and further comprises a first planetary-gear assembly 2 and a second planetary-gear assembly 3. The first planetary-gear assembly 2 and the second planetary-gear assembly 3 are each an epicyclic gear system comprising a sun gear 4, a primary planet gear 5, a plurality of secondary planet gears 6, and a ring gear 7. Referring to FIG. 1, the first planetary-gear assembly 2 and the second planetary-gear assembly 3 are mounted offset from each other to symmetrically support the gear-pin assembly 20 from opposing sides. More specifically, the sun gear 4 from the first planetary-gear assembly 2 and the sun gear 4 from the second planetary-gear assembly 3 are concentrically positioned with each other about a main rotation axis 18. As such, the first planetary-gear assembly 2 and the second planetary-gear assembly 3 are mounted and centered about the main rotation axis 18. Similar to traditional designs, the sun gear 4 is a relatively small spur gear which acts as the center support member for the primary planet gear 5, the plurality of secondary planet gears 6, and the ring gear 7. The sun gear 4 acts a structural member in order to support the primary planet gear 5, the plurality of secondary planet gears 6, and the ring gear 7. Additionally, in general, when the sun gear 4 is rotated, the sun gear 4 raises or lowers the top dead center (TDC) height of the piston-and-connecting rod assembly 27, thus changing the compression ratio.

The primary planet gear 5 and each of the plurality of secondary planet gears 6 are radially distributed about the sun gear 4 and are each a spur gear that is mechanically engaged to the sun gear 4. Similar to traditional designs, the primary planet gear 5 and each of the plurality of secondary planet gears 6 revolve about the sun gear 4, i.e. the main rotation axis 18. The primary planet gear 5 of the first planetary-gear assembly 2 and the primary planet gear 5 of the second planetary-gear assembly 3 support the gear-pin assembly 20 to translates the linear motion of the piston-and-connecting rod assembly 27 into rotational motion about the main rotation axis 18. The plurality of secondary planet gears 6 assists in the transmission of torsional forces, counter-balances the primary planet gear 5, and support the ring gear 7 such that the ring gear 7 can symmetrically rotate about the main rotation axis 18. The ring gear 7 is mounted coaxial with the sun gear 4 and mechanically engages with the primary planet gear 5 and each of the plurality of secondary planet gears 6. Thus, the ring gear 7 encompasses the sun gear 4, the primary planet gear 5, and the plurality of secondary planet gears 6. When the primary planet gear 5 rotates about the sun gear 4, the ring gear 7 is rotated by the primary planet gear 5 and the plurality of secondary planet gears 6 about the main rotation axis 18 because the sun gear 4 is held fixed. The sun gear 4 only rotates slightly when varying the compression ratio.

Figure 3:
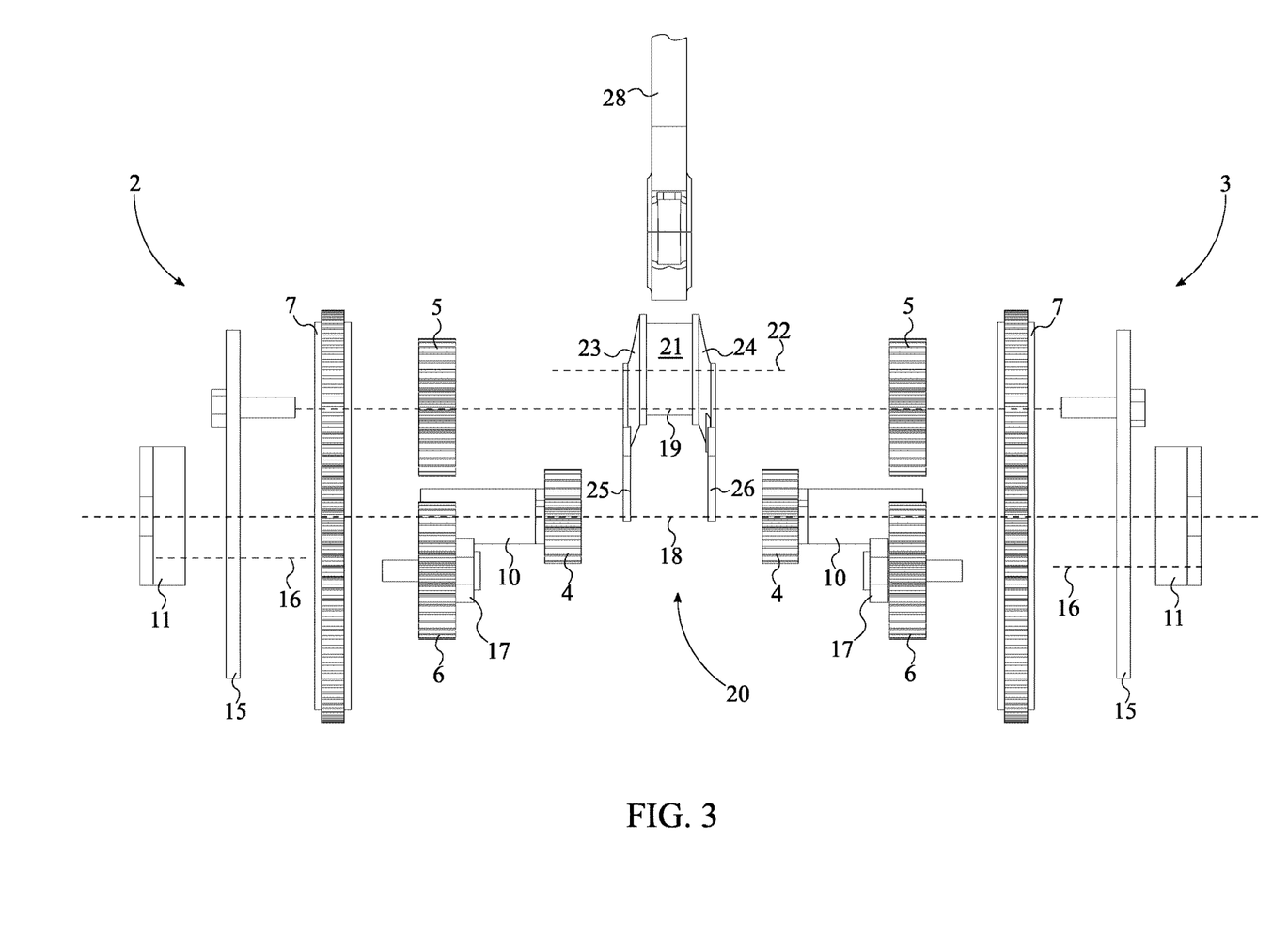
FIG. 3 is a front exploded view of the present invention.

The gear-pin assembly 20 is an eccentric journal which acts as the crankpin element to mechanically couple the piston-and-connecting rod assembly 27 to the mirror-image planetary-gear assembly 1. Referring to FIG. 3, the primary planet gear 5 from the first planetary-gear assembly 2 and the primary planet gear 5 from the second planetary-gear assembly 3 are concentrically positioned with each other along a shared rotation axis 19 and support the gear-pin assembly 20. More specifically, the gear-pin assembly 20 is torsionally and eccentrically connected in between the primary planet gear 5 from the first planetary-gear assembly 2 and the primary planet gear 5 from the second planetary-gear assembly 3. The gear pin assembly 20 forces the first planetary-gear assembly 2 and the second planetary-gear assembly 3 to radially translate at the same rate. It is important to note that the gear-pin assembly 20 is eccentric in respect to the shared rotation axis 19. This configuration is key in varying the TDC height and, therefore, varying the compression ratio. The piston-and-connecting rod assembly 27 applies a linear force onto the gear-pin assembly 20 through traditional combustion-based methods, or other similar methods. In general, the piston-and-connecting rod assembly 27 is mechanically coupled to the gear-pin assembly 20 in order to impart motion onto the mirror-image planetary-gear assembly 1.

Figure 5:
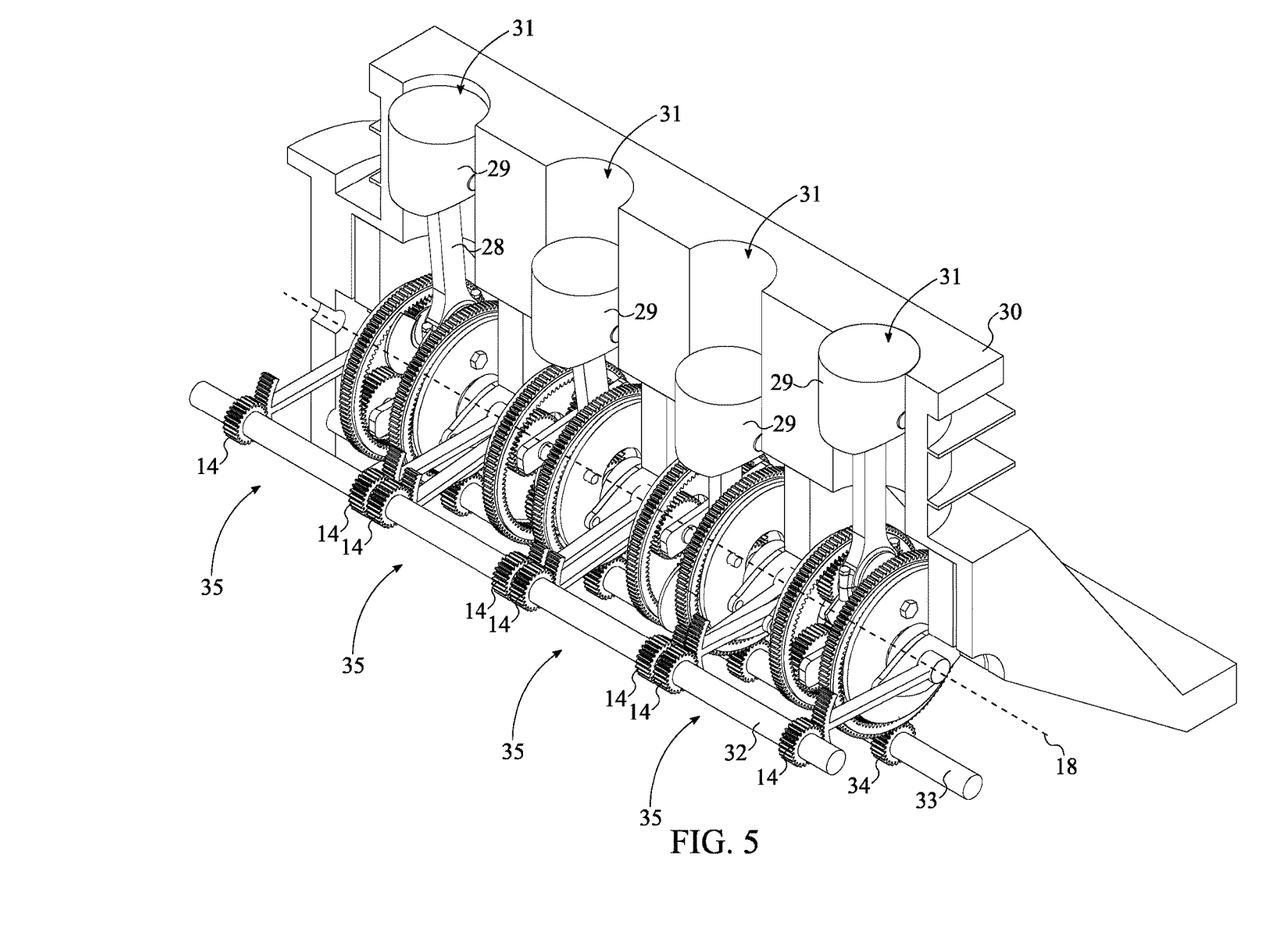
FIG. 5 is a perspective view of the present invention integrated into an inline four-cylinder internal combustion engine.

Referring to FIG. 5, relative to the internal combustion engine, the mirror-image planetary-gear assembly 1, the gear-pin assembly 20, and the piston-and-connecting rod assembly 27 are rotatably mounted within an engine block 30 of the internal combustion engine. Additionally, the piston-and-connecting rod assembly 27 is slidably positioned within a cylinder 31 of the engine block 30 to create a combustion chamber. The combustion chamber size directly dictates the compression ratio of the internal combustion engine.

The overall method of the present invention begins with the expansion of high-pressure and high-temperature gases produced by combustion in the combustion chamber. The overall method of the present invention is disclosed in relation to both the first planetary-gear assembly 2 and the second planetary-gear assembly 3; in particular, the subcomponents of the first planetary-gear assembly 2 move identical with the same subcomponents of the second planetary-gear assembly 3. This expanding gas applies a force onto the piston-and-connecting rod assembly 27, forcing the piston-and-connecting rod assembly 27 to translate towards the main rotation axis 18, this direction will be referenced as downwards, within the cylinder 31. In turn, the piston-and-connecting rod assembly 27 applies a force onto the gear-pin assembly 20. Because the gear-pin assembly 20 is connected to the primary planet gear 5, the primary planet gear 5 begins to rotate about the shared rotation axis 19 and the main rotation axis 18. As the primary planet gear 5 travels about the main rotation axis 18, the piston-and-connecting rod assembly 27 repeatedly reverses directions and, resultantly, travels in a reciprocating motion within the cylinder 31, similar to conventional designs. Repeated combustion within the cylinder 31 at specific increments continuously applies energy into the mirror-image planetary-gear assembly 1 through the aforementioned process. This process mimics a crankshaft mechanism found in traditional internal combustion engines.

Due to the characteristics of epicyclical gearing, the primary planet gear 5 and the plurality of secondary planet gears 6 rotate about the main rotation axis 18 at the same rate. This rotation forces the ring gear 7 to rotate about the main rotation axis 18 as the sun gear 4 is kept fixed. The rotational speed of the ring gear 7 is different relative to the rotational speed of primary planet gear 5 due to differences in size and teeth number. The rotational motion/energy of the ring gear 7 is then transferred to an output power shaft 33. The output power shaft 33 receives rotational energy from the mirror-image planetary-gear assembly 1 and transmits said rotational energy out of the internal combustion engine. To transmit the output power, the output power shaft 33 is positioned parallel and offset to the main rotation axis 18. Additionally, output power shaft 33 is torsionally coupled to the ring gear 7. As described above, this process occurs for both the first planetary-gear assembly 2 and the second planetary-gear assembly 3. In particular, the output power shaft 33 is torsionally coupled to the ring gear 7 from the first planetary-gear assembly 2 and the ring gear 7 from the second planetary-gear assembly 3.

In order to vary the compression chamber volume, the TDC height of the piston-and-connecting rod assembly 27 is raised or lowered. This height change is achieved by uniformly rotating both the sun gear 4 of the first planetary-gear assembly 2 and the sun gear 4 of the second planetary-gear assembly 3. The following description of movement is disclosed in relation to both the first planetary-gear assembly 2 and the second planetary-gear assembly 3. To raise or lower the TDC height, the sun gear 4 is partially rotated. In the preferred embodiment of the present invention, the gearing and sizing between the primary planet gear 5, the plurality of secondary planet gears 6, the sun gear 4, and the ring gear 7 may be altered to achieve a number of different cycles, different TDC heights, different chamber sizes, and more.

The gear-pin assembly 20 is eccentrically positioned relative to the shared rotation axis 19, the TDC height can be modified through the rotation of the primary planet gear 5, i.e. partial rotation of the sun gear 4. In other words, the primary planet gear 5 travels along a circular path around the sun gear 4 while the gear-pin assembly 20 travels along a circular path wrapped around the sun gear 4. As a result, the gear-pin assembly 20 always returns to the same orientation at TDC height as long as the sun gear 4 has not moved; wherein the TDC height is defined by the point of travel at which location the piston-and-connecting rod assembly 27 stops movement in the upward travel direction to begin the downward stroke; and, wherein a single cycle is defined by a single full 360-degree rotation of the primary planet gear 5 about the main rotation axis 18. Because of the characteristics of epicyclical gearing, partially rotating the sun gear 4 rotates the relative position of primary planet gear 5 and each of the plurality secondary planet gears 6. The partial rotation of sun gear 4 alters the orientation of the primary planet gear 5 and the orientation of the gear-pin assembly 20 at TDC height. Thus, a partial rotation of the sun gear 4 raises or lowers the TDC height for the cycle and in turn raising or lowering the compression ratio.

Figure 2:
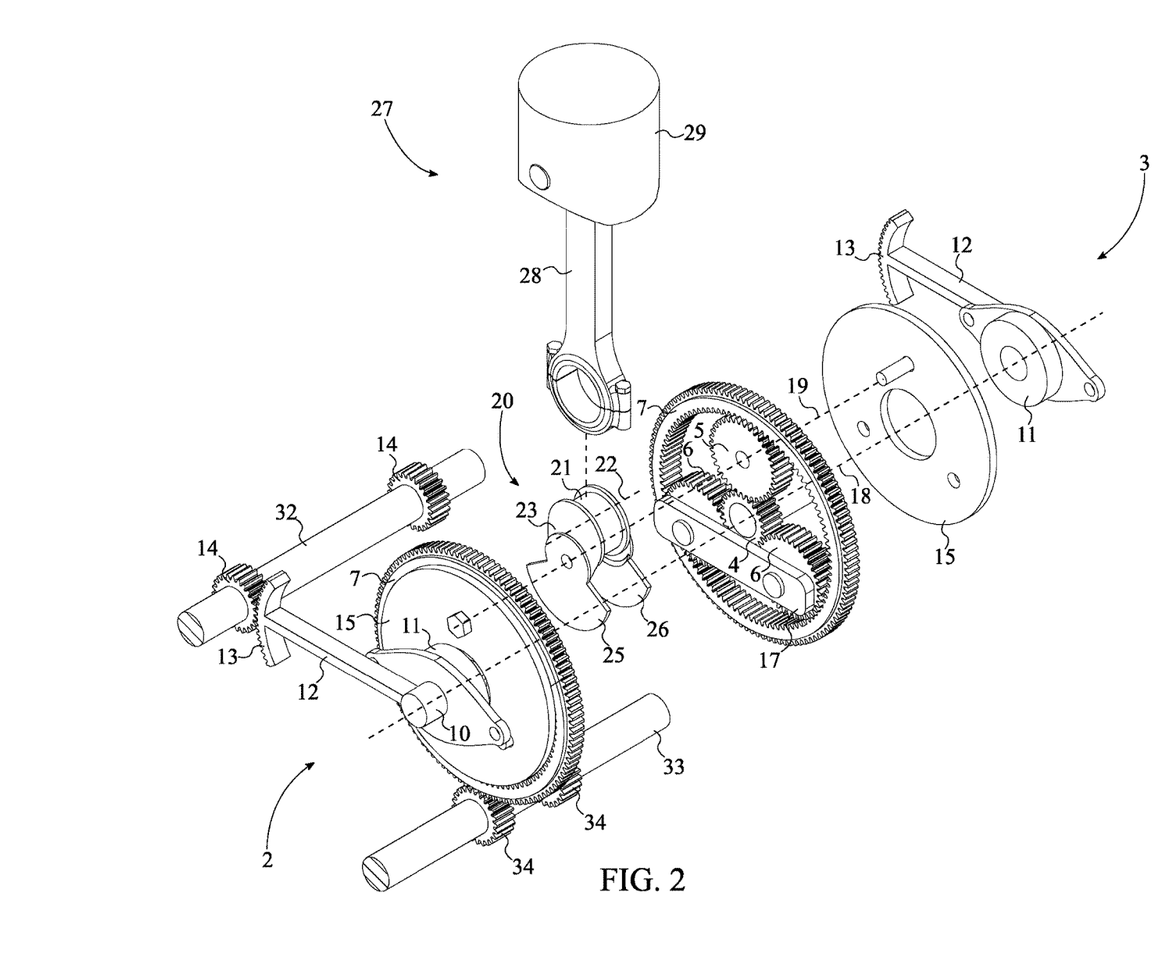
FIG. 2 is a perspective exploded view of the present invention.

Referring to FIG. 2, the first planetary-gear assembly 2 and the second planetary-gear assembly 3 each further comprise a ratio-adjustment mounting shaft 10 and a bearing 11. The ratio-adjustment mounting shaft 10 controls the radial displacement and rotation of the sun gear 4, thus varying the relative position of the primary planet gear 5 and, therefore, changes the compression ratio. The ratio-adjustment shaft is positioned adjacent to the sun gear 4, opposite the gear-pin assembly 20. Additionally, the ratio-adjustment mounting shaft 10 is torsionally and axially connected to the sun gear 4 such that any rotational movement of the ratio-adjustment mounting shaft 10 will translate to an equivalent rotational movement of the sun gear 4. The bearing 11 rotatably mounts the ratio-adjustment mounting shaft 10 within the engine block 30. More specifically, the mirror-image planetary-gear assembly 1, the gear-pin assembly 20, and the piston-and-connecting rod assembly 27 are positioned within the engine block 30. The bearing 11 is adjacently connected within the engine block 30, adjacent to the sun gear 4. The ratio-adjustment mounting shaft 10 is attached within the bearing 11 such that the ratio-adjustment mounting shaft 10 is rotatably mounted to the engine block 30 with the bearing 11. This configuration is identical to the first planetary-gear assembly 2 and the second planetary-gear assembly 3. In alternative embodiments, different means and mechanisms may be used to mount the mirror-image planetary-gear assembly 1 within the engine block 30.

The ratio-adjustment mounting shaft 10 may be controlled through a variety of means. In the preferred embodiment of the present invention, the ratio-adjustment mounting shaft 10 is controlled by the ratio-control shaft 32. More specifically, the ratio-control shaft 32 is mechanically coupled to the ratio-adjustment mounting shaft 10 of the first planetary-gear assembly 2 and the ratio-adjustment mounting shaft 10 of the second planetary-gear assembly 3. For this coupling, the first planetary-gear assembly 2 and the second planetary-gear assembly 3 each further comprise a control arm 12, an arc gear 13, and a drive-adjustment gear 14 to mechanically couple the ratio-control shaft 32 to the ratio-adjustment mounting shaft 10. The ratio-control shaft 32 is rotatably mounted within the engine block 30, in particular the ratio-control shaft 32 is mounted parallel and offset to the ratio-adjustment mounting shaft 10. The control arm 12 is an elongated plate or rod that is terminally and perpendicularly connected to the ratio-adjustment mounting shaft 10. The arc gear 13 is a semi-annular gear that is terminally connected to the control arm 12, opposite to the ratio-adjustment mounting shaft 10. The drive-adjustment gear 14 is concentrically connected about the ratio-control shaft 32 and is mechanically engaged with the drive-adjustment gear 14. Resultantly, rotational motion of the ratio-control shaft 32 raises or lowers one end of the control arm 12 through the mechanical engaged between the arc gear 13 and the drive-adjustment gear 14. This engagement rotates the ratio-adjustment mounting shaft 10 and the sun gear 4, and resultantly changes the compression ratio. In relation to the overall system, the ratio-control shaft 32 is mechanically coupled to the ratio-adjustment mounting shaft 10 of the first planetary-gear assembly 2 and the ratio-adjustment mounting shaft 10 of the second planetary-gear assembly 3.

The ratio-control shaft 32 is managed by a variable compression-ratio drive unit. The variable compression-ratio drive unit is preferably a conventional pneumatic-to-rotational actuator. The variable compression-ratio drive unit senses the manifold or intake pressure as well as other engine parameters and translates the ratio-control shaft 32 accordingly to a predefined/specified setting. In particular, the variable compression ratio-drive unit is torsionally coupled to the ratio-control shaft 32 to directly control the angular displacement of the ratio-control shaft 32. A variety of alternative methods may be used to rotate the ratio-control shaft 32 and control the compression ratio. In an alternative embodiment of the present invention, an electric servo-motor or hydraulic actuator is torsionally connected to the ratio-control shaft 32.

Referring to FIG. 3, the gear-pin assembly 20 comprises a bearing journal shaft 21, a first mounting foot 23, and a second mounting foot 24. The first mounting foot 23 and the second mounting foot 24 connect the bearing journal shaft 21 to the primary planet gear 5 of the first planetary-gear assembly 2 and to the primary planet gear 5 of the second planetary-gear assembly 3 at an offset distance, i.e. eccentrically. More specifically, a central axis 22 of the bearing journal shaft 21 is positioned parallel and offset to the shared rotation axis 19. The first mounting foot 23 and the second mounting foot 24 are structural elements designed to support the bearing journal shaft 21. As such, the first mounting foot 23 and the second mounting foot 24 are positioned opposite to each other, across the bearing journal shaft 21. More specifically, the first mounting foot 23 is connected in between the bearing journal shaft 21 and the primary planet gear 5 of the first planetary-gear assembly 2. Similarly, the second mounting foot 24 is connected in between the bearing journal shaft 21 and the primary planet gear 5 of the second planetary-gear assembly 3. This provides symmetrical support to the bearing journal shaft 21.

The piston-and-connecting rod assembly 27 rotates around the bearing journal shaft 21 and about the central axis 22, wherein the bearing journal shaft 21 is eccentrically mounted relative to the shared rotation axis 19. The TDC height can be varied by changing the relative rotational position of the primary planet gear 5, i.e. partial rotation of the sun gear 4. This aspect is described in relation to both the first planetary-gear assembly 2 and the second planetary-gear assembly 3. The primary planet gear 5 travels along a circular path around the sun gear 4 while the bearing journal shaft 21 of the gear-pin assembly 20 travels along a different path around the sun gear 4. As a result, the gear-pin assembly 20 always returns to the same orientation at TDC height as long as the sun gear 4 has not moved; but the relative offset of the bearing journal shaft 21 can be raised or lowered by rotating sun gear 4 a fixed amount and, therefore, changing the relative position of the primary planet gear 5, changing the path of the of the bearing journal shaft 21 and, therefore, raising or lowering the TDC.

The present invention utilizes a multitude of methods in order to ensure that the mirror-image planetary-gear assembly 1 is adequately balanced during operations, thus decreasing vibration, decreasing energy loses, and increasing efficiency of the internal combustion engine. More specifically, the first planetary-gear assembly 2 and the second planetary-gear assembly 3 each further comprise an eccentric annular external-counterweight 15 and a counterweight coupling plate 17. The eccentric annular external-counterweight 15 is a circular plate with a hole that is positioned off-center, thus positioning a majority of its weight one half of the circular plate. The eccentric annular external-counterweight 15 is positioned adjacent to the primary planet gear 5 and the plurality of secondary planet gears 6, opposite the gear-pin assembly 20. Additionally, the eccentric annular external-counterweight 15 is positioned around the ratio-adjustment mounting shaft 10, thus allowing the eccentric annular external-counterweight 15 to rotate without engaging the ratio-adjustment mounting shaft 10. The eccentric annular external-counterweight 15 is designed to rotate about the main rotation axis 18 with the primary planet gear 5 and the plurality of secondary planet gears 6 in order to counter balance the weight of the gear-pin assembly 20, the piston-and-connecting rod assembly 27, and any forces associated with the aforementioned components. As such, the eccentric annular external-counterweight 15 is rotatably mounted to the primary planet gear 5 and each of the plurality of secondary planet gears 6. Additionally, a center of gravity 16 of the eccentric annular external-counterweight 15 and the shared rotation axis 19 are positioned opposite to each other about the ratio-adjustment mounting shaft 10.

Referring to FIG. 2, the counterweight coupling plate 17 adds to the eccentric annular external-counterweight 15. The counterweight coupling plate 17 is an elongated plate, preferably of a rectangular shape, that is attached to the plurality of secondary planet gears 6. More specifically, the counterweight plate is positioned in between the first planetary-gear assembly 2 and the second planetary-gear assembly 3. The counterweight plate is rotatably mounted to each of the plurality of secondary planet gears 6. It is understood that the design, shape, weight, and material configuration of the eccentric annular external-counterweight 15 and the counterweight coupling plate 17 is subject to change.

Additionally, in the preferred embodiment of the present invention, the gear-pin assembly 20 further comprises a first counterweight plate 25 and a second counterweight plate 26. The first counterweight plate 25 and the second counterweight plate 26 apply counterbalance to the shared rotational axis 19 where out-of-balance is created by the eccentrically positioned bearing journal shaft 21. The first counterweight plate 25 and the second counterweight plate 26 are each a semi-circular plate. The first counterweight plate 25 is terminally connected to the first mounting foot 23, opposite the bearing journal shaft 21. Similarly, the second counterweight plate 26 is terminally connected to the second mounting foot 24, opposite the bearing journal shaft 21. This arrangement positions the journal bearing shaft 21 opposite to the first counterweight plate 25 and the second counterweight plate 26 across the shared rotation axis 19.

Similar to traditional designs, referring to FIG. 3, the piston-and-connecting rod assembly 27 comprises a piston rod 28 and a piston 29. The piston rod 28 attaches the journal bearing shaft 21 to the piston 29 in order to impart motion onto the bearing journal shaft 21. The piston 29 controls and seals the internal volume within the cylinder 31 and in order to delineate the combustion chamber. The piston rod 28 is rotatably and terminally connected to the bearing journal shaft 21. The piston 29 is positioned adjacent to the piston rod 28, opposite the bearing journal shaft 21 with the piston 29 being rotatably being connected to the piston rod 28. Resultantly, the piston 29 is able to slide along and within the cylinder 31 while the piston rod 28 rotates with the bearing journal shaft 21 in order to translate and transfer linear motion from the piston 29 to rotational motion to the mirror-image planetary-gear assembly 1.

Figure 4:
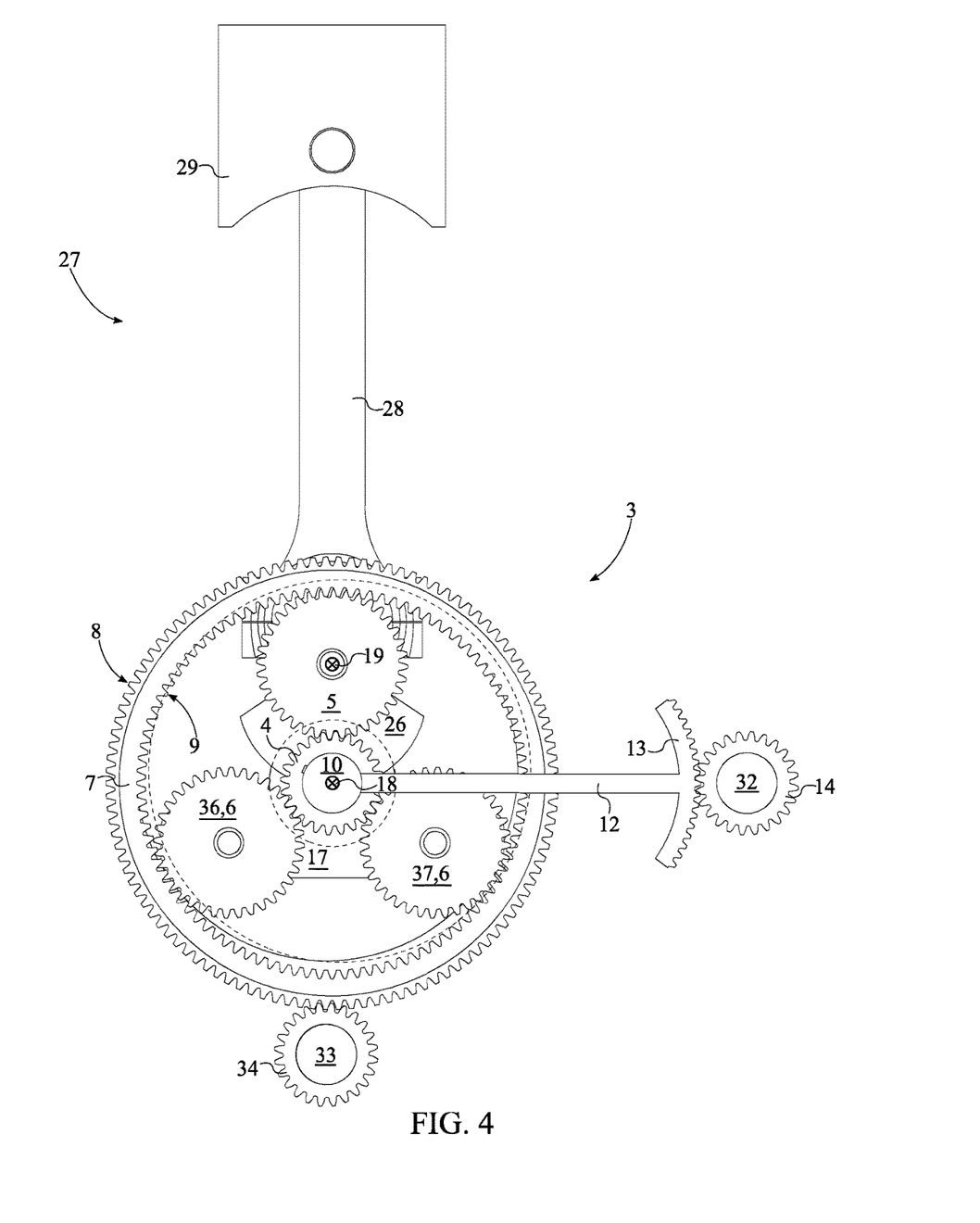
FIG. 4 is a side view of the a partially internal view of the present invention.

Referring to FIG. 4, the ring gear 7 may be coupled to the output power shaft 33 through a variety of means. In one embodiment, the ring gear 7 is coupled to the output power shaft 33 through a chain. In the preferred embodiment, the ring gear 7 is coupled to the output power shaft 33 through a gear mesh. More specifically, the ring gear 7 is an internal-external ring gear that comprises an external ring gear 8 and an internal ring gear 9. The internal ring gear 9 meshes with and is designed complimentary to the primary planet gear 5 and each of the plurality of secondary planet gears 6. More specifically, the primary planet gear 5 and each of the plurality of secondary planet gears 6 are mechanically engaged with the internal ring gear 9. The first planetary-gear assembly 2 and the second planetary-gear assembly 3 each further comprise an output driven gear 34. The output driven gear 34 is concentrically connected about the output power shaft 33 and is positioned coplanar with the internal-external ring gear. In order to transfer rotational energy/motion, the external ring gear 8 is mechanically engaged to the output driven gear 34.

Referring to FIG. 5, the present invention may be integrated into a variety of different sized and differently configured internal combustion engines. Some examples include four-cylinder inline engine designs, six-cylinder inline or V engine designs, diesel-based engines, gasoline-based engines, and other traditional engines/designs. For embodiments with a plurality of cylinders, the present invention comprises a plurality of Internal Combustion (IC) mechanisms 35; wherein each of the plurality of IC mechanisms 35 comprises the mirror-image planetary-gear assembly 1, the gear-pin assembly 20, the piston-and-connecting rod assembly 27. For such instances, the plurality of IC mechanisms 35 is linearly distributed about the engine block 30 with each of the plurality of IC mechanisms 35 being rotatably mounted within the engine block 30 as described above. The piston 29 from the piston-and-connecting rod assembly 27 from each of the plurality of IC mechanisms 35 is slidably positioned within a corresponding cylinder 31 from the engine block 30. Additionally, the ratio-control shaft 32 is mechanically coupled to each of the plurality of IC mechanisms 35. Furthermore, the output power shaft 33 is mechanically coupled to each of the plurality of IC mechanisms 35 in order transfer the generated rotational motion by the plurality of IC mechanisms 35 out of the engine block 30, preferably to a coupled transmission.

In one embodiment, the mirror-image planetary-gear assembly 1 utilizes a 1:2:5 tooth configuration in order to accomplish a two-long-stroke and two-short-stroke cycle, i.e. a four-stroke cycle. More specifically, a main tooth ratio between the sun gear 4, the plurality of secondary planet gears 6 and the primary planet gear 5, and the internal gear 8 is 1:2:5. In this embodiment one sun gear 4, one primary planet gear 5, two gears within the plurality of secondary planet gears 6, and one ring gear 7 exist. Specifically, the plurality of secondary planet gears 6 comprises a first planet gear 36 and a second planet gear 37. Wherein the first planet gear 36, the second planet gear 37, and the primary planet gear 5 are radially distributed about the sun gear 4. Additionally, the first planet gear 36, the second planet gear 37, and the primary planet gear 5 are mechanically engaged in between the sun gear 4 and the ring gear 7. The counterweight coupling plate 17 is rotatably mounted to the first planet gear and the second planet gear. At TDC height, the partial rotational movement of the sun gear 4 permits the compression ratio to vary typically between 8:1 and 37:1 by varying the degree of rotation of the sun gear 4 from 0 degrees to approximately 50 degrees. As mentioned above, the degree of rotation is directly dependent on the intake manifold pressure and the fuel being used.

The variable compression ratio-drive unit may be provided to partially rotate the variable compression ratio shaft 32, rotates the variable compression drive gear 14, engages the arc gear 13, moves control arm 12, rotates support shaft 10, and ultimately rotates the sun gear 4 such that a predetermined controlled pressure at any TDC height can be maintained at time of ignition. This process is applicable to both the first planetary-gear assembly 2 and the second planetary-gear assembly 3.

Referring to FIG. 4, this configuration allows for a longer power and exhaust strokes than the intake and compression strokes. More specifically, each time the primary planet gear 5 makes a single revolution about the sun gear 4 and the main rotational axis 18, the primary planet gear 5 rotates one-half turn about the shared rotation axis 19. The one-half turn performs two of the four strokes while the second revolution of the primary planet gear 5 around the sun gear 4 performs the remaining two strokes. The internal ring gear 9 contains five times the number of teeth than the sun gear 4 and the external ring gear 8 need not contain any specific number of teeth. However, since mathematically for the 1:2:5 main tooth ratio, the ring gear 7 rotates 1.2 times faster than the orbital speed of the primary planet gear 5, the number of teeth on the external ring gear 8 can be arbitrarily set at 96 teeth. Therefore, to arbitrarily set the rotational speed of the output power shaft 33 to 3.2 times the orbital speed of the primary planet gear 5, the speed of the output driven gear 34 would contain the same number of teeth as the primary planet gear 5 and each of the plurality of secondary planet gears 6. The speed of the output power shaft 33 can be set to any rotational speed ratio but the intent of setting the ratio to be 3.2 times greater speed is to provide direct couple to an alternator at the front of the internal combustion engine and to provide power transmissions of much smaller size at the rear of the internal combustion engine.

One particular implementation includes setting the tooth number of the sun gear 4 to 18 teeth, the primary planet gear 5 and each of the secondary planet gears to 36 teeth, the internal ring gear 9 to 90 teeth, the external ring gear 8 to 96 teeth, and the output driven gear 34 to 36 teeth to yield rotational speed of the output power shaft 33 to 3.2 times the orbital speed of the primary planet gear 5. Other settings may be used for the main tooth ratio may also be utilized.

In another embodiment, the mirror-image planetary-gear assembly 1 utilizes a 1:1:3 tooth configuration in order to accomplish variable compression ratio adjustment with single stroke length, two-stroke cycle operation. More specifically, the main tooth ratio between the sun gear 4, the plurality of secondary planet gears 6 and the primary planet gear 5, and the internal ring gear 9 is 1:1:3.

In one embodiment, the present invention may further comprise an at least one hydraulic clutch pack. The hydraulic clutch pack allows the present invention to engage or disengage one or more from the plurality of IC mechanisms 35. The hydraulic clutch pack can be added to the external ring gear 8 of the first planetary-gear assembly 2 and the external ring gear 8 of the second planetary-gear assembly 3 from a specific IC mechanism from the plurality of IC mechanisms 35. The hydraulic clutch pack can also be added to the output power shaft 33 between the driven output driven gear 34 to engage or disengage a specific IC mechanism from the plurality of IC mechanisms 35. The hydraulic clutch pack is capable of stopping the movement of the piston-and-connecting rod assembly 27, thus activating or deactivating the specific IC mechanism 35.

Although the invention has been explained in relation to its preferred embodiment, it is to be understood that many other possible modifications and variations can be made without departing from the spirit and scope of the invention as hereinafter claimed.

What is claimed is:

1. An infinitely variable compression ratio and single stroke length mechanism or dual stroke length mechanism of reciprocating 2-cycle or 4-cycle internal combustion engine comprises:
    a mirror-image planetary-gear assembly;
    a gear-pin assembly;
    a piston-and-connecting rod assembly;
    the mirror-image planetary-gear assembly comprises a first planetary-gear assembly and a second planetary-gear assembly;
    the first planetary-gear assembly and the second planetary-gear assembly each comprise a sun gear, a primary planet gear, a plurality of secondary planet gears, and a ring gear;
    the first planetary-gear assembly and the second planetary-gear assembly being mounted offset from each other;
    the sun gear from the first planetary-gear assembly and the sun gear from the second planetary-gear assembly being concentrically positioned with each other about a main rotation axis;
    the primary planet gear from the first planetary-gear assembly and the primary planet gear from the second planetary-gear assembly being concentrically positioned with each other along a shared rotation axis;
    the gear-pin assembly being torsionally and eccentrically connected in between the primary planet gear from the first planetary-gear assembly and the primary planet gear from the second planetary-gear assembly; and
    the piston-and-connecting rod assembly being mechanically coupled to the gear-pin assembly.

2. The infinitely variable compression ratio and single stroke length mechanism or dual stroke length mechanism of reciprocating 2-cycle or 4-cycle internal combustion engine as claimed in claim 1 comprises:
    the first planetary-gear assembly and the second planetary-gear assembly gear assembly each further comprise a ratio-adjustment mounting shaft;
    the ratio-adjustment mounting shaft being positioned adjacent to the sun gear, opposite the gear-pin assembly; and
    the ratio-adjustment mounting shaft being torsionally and axially connected to the sun gear.

3. The infinitely variable compression ratio and single stroke length mechanism or dual stroke length mechanism of reciprocating 2-cycle or 4-cycle internal combustion engine as claimed in claim 2 comprises:
- an engine block;
- the first planetary-gear assembly and the second planetary-gear assembly gear assembly each further comprise a bearing;
- the mirror-image planetary-gear assembly, the gear-pin assembly, and the piston-and-connecting rod assembly being positioned within the engine block;
- the bearing being adjacently connected within the engine block, adjacent to the sun gear;
- the ratio-adjustment mounting shaft being rotatably mounted to the engine block with the bearing; and
- a piston from the piston-and-connecting rod assembly being slidably engaged with a cylinder from the engine block.

4. The infinitely variable compression ratio and single stroke length mechanism or dual stroke length mechanism of reciprocating 2-cycle or 4-cycle internal combustion engine as claimed in claim 2 comprises:
- a ratio-control shaft;
- the first planetary-gear assembly and the second planetary-gear assembly each further comprise a control arm, an arc gear, and a drive-adjustment gear;
- the ratio-control shaft being mounted parallel and offset to the ratio-adjustment mounting shaft;
- the control arm being terminally and perpendicularly connected to the ratio-adjustment mounting shaft;
- the arc gear being terminally connected to the control arm, opposite to the ratio-adjustment mounting shaft;
- the drive-adjustment gear being concentrically connected about the ratio-control shaft; and
- the arc gear being mechanically engaged with the drive-adjustment gear.

5. The infinitely variable compression ratio and single stroke length mechanism or dual stroke length mechanism of reciprocating 2-cycle or 4-cycle internal combustion engine as claimed in claim 2 comprises:
- the first planetary-gear assembly and the second planetary-gear assembly gear assembly each further comprise an eccentric annular external-counterweight;
- the eccentric annular external-counterweight being positioned adjacent to the primary planet gear and the plurality of secondary planet gears, opposite the gear-pin assembly;
- the eccentric annular external-counterweight being positioned around the ratio-adjustment mounting shaft;
- the eccentric annular external-counterweight being rotatably mounted to the primary planet gear and each of the plurality of secondary planet gears; and
- a center of gravity of the eccentric annular external-counterweight and the shared rotation axis being positioned opposite to each other about the ratio-adjustment mounting shaft.

6. The infinitely variable compression ratio and single stroke length mechanism or dual stroke length mechanism of reciprocating 2-cycle or 4-cycle internal combustion engine as claimed in claim 1 comprises:
- an output power shaft;
- an engine block;
- the mirror-image planetary-gear assembly, the gear-pin assembly, and the piston-and-connecting rod assembly being rotatably mounted within the engine block;
- the output power shaft being positioned parallel and offset to the main rotation axis;
- the output power shaft being rotatably mounted within the engine block;
- the ring gear from the first planetary-gear assembly being torsionally coupled to the output power shaft;
- the ring gear from the second planetary-gear assembly being torsionally coupled to the output power shaft; and
- a piston from the piston-and-connecting rod assembly being slidably engaged with a cylinder from the engine block.

7. The infinitely variable compression ratio and single stroke length mechanism or dual stroke length mechanism of reciprocating 2-cycle or 4-cycle internal combustion engine as claimed in claim 6 comprises:
- the ring gear being an internal-external ring gear;
- the internal-external ring gear comprises an external ring gear and an internal ring gear;
- the first planetary-gear assembly further comprises an output driven gear;
- the output driven gear being concentrically connected about the output power shaft;
- the output driven gear being positioned coplanar with the internal-external ring gear;
- the external ring gear being mechanically engaged to the output driven gear; and
- the primary planet gear and each of the plurality of secondary planet gears being mechanically engaged to the internal ring gear.

8. The infinitely variable compression ratio and single stroke length mechanism or dual stroke length mechanism of reciprocating 2-cycle or 4-cycle internal combustion engine as claimed in claim 6 comprises:
- the ring gear being an internal-external ring gear;
- the internal-external ring gear comprises an external ring gear and an internal ring gear;
- the second planetary-gear assembly further comprises an output driven gear;
- the output driven gear being concentrically connected about the output power shaft;
- the output driven gear being positioned coplanar with the internal-external ring gear;
- the external ring gear being mechanically engaged to the output driven gear; and
- the primary planet gear and each of the plurality of secondary planet gears being mechanically engaged to the internal ring gear.

9. The infinitely variable compression ratio and single stroke length mechanism or dual stroke length mechanism of reciprocating 2-cycle or 4-cycle internal combustion engine as claimed in claim 1 comprises:
- the gear-pin assembly comprises a bearing journal shaft, a first mounting foot, and a second mounting foot;
- a central axis of the bearing journal shaft being positioned parallel and offset to the shared rotation axis;
- the first mounting foot and the second mounting foot being positioned opposite to each other, across the bearing journal shaft;
- the first mounting foot being connected in between the bearing journal shaft and the primary planet gear of the first planetary-gear assembly; and
- the second mounting foot being connected in between the bearing journal shaft and the primary planet gear of the second planetary-gear assembly.

10. The infinitely variable compression ratio and single stroke length mechanism or dual stroke length mechanism of reciprocating 2-cycle or 4-cycle internal combustion engine as claimed in claim 9 comprises:

the gear-pin assembly comprises a first counterweight plate and a second counterweight plate;

the first counterweight plate being terminally connected to the first mounting foot, opposite the bearing journal shaft; and the second counterweight plate being terminally connected to the second mounting foot, opposite the bearing journal shaft.

11. The infinitely variable compression ratio and single stroke length mechanism or dual stroke length mechanism of reciprocating 2-cycle or 4-cycle internal combustion engine as claimed in claim 1 comprises:

the piston-and-connecting rod assembly comprises a piston rod and a piston;

the piston rod being rotatably and terminally connected to a bearing journal shaft of the gear-pin assembly;

the piston being positioned adjacent to the piston rod, opposite the bearing journal shaft; and the piston being rotatably connected to the piston rod.

12. The infinitely variable compression ratio and single stroke length mechanism or dual stroke length mechanism of reciprocating 2-cycle or 4-cycle internal combustion engine as claimed in claim 1 comprises:

the first planetary-gear assembly and the second planetary-gear assembly gear assembly each further comprise a counterweight coupling plate;

the plurality of secondary planet gears comprises a first planet gear and a second planet gear;

the first planet gear, the second planet gear, and the primary planet gear being radially distributed about the sun gear;

the first planet gear, the second planet gear, and the primary planet gear being mechanically engaged in between the sun gear and the ring gear;

the counterweight coupling plate being positioned in between the first planetary-gear assembly and the second planetary-gear assembly; and the counterweight coupling plate being rotatably mounted to the first planet gear and the second planet gear.

13. The infinitely variable compression ratio and single stroke length mechanism or dual stroke length mechanism of reciprocating 2-cycle or 4-cycle internal combustion engine as claimed in claim 1 comprises:

an engine block;

a plurality of internal combustion (IC) mechanisms;

each of the plurality of IC mechanisms comprises the mirror-image planetary-gear assembly, the gear-pin assembly, and the piston-and-connecting rod assembly;

the plurality of IC mechanisms being linearly distributed along the engine block;

each of the plurality of IC mechanisms being rotatably mounted within the engine block; and a piston from the piston-and-connecting rod assembly from each of the plurality of IC mechanisms being slidably positioned within a corresponding cylinder from the engine block.

14. The infinitely variable compression ratio and single stroke length mechanism or dual stroke length mechanism of reciprocating 2-cycle or 4-cycle internal combustion engine as claimed in claim 1, wherein a main tooth ratio between the sun gear, the plurality of secondary planet gears and the primary planet gear, and an internal ring gear of the ring gear is 1:1:3.

15. The infinitely variable compression ratio and single stroke length mechanism or dual stroke length mechanism of reciprocating 2-cycle or 4-cycle internal combustion engine as claimed in claim 1, wherein a main tooth ratio between the sun gear, the plurality of secondary planet gears and the primary planet gear, and the internal ring gear of the ring gear is 1:2:5.

* * * * *